US009094903B2

(12) United States Patent
Jolma et al.

(10) Patent No.: US 9,094,903 B2
(45) Date of Patent: Jul. 28, 2015

(54) METHOD AND APPARATUS FOR DISTRIBUTION OF TOPOLOGY INFORMATION IN COMMUNICATION NETWORKS

(75) Inventors: Petri Antero Jolma, Nurmijärvi (FI); Roman Pichna, Espoo (FI)

(73) Assignee: Nokia Solutions and Networks OY, Espoo (FI)

( * ) Notice: Subject to any disclaimer, the term of this patent is extended or adjusted under 35 U.S.C. 154(b) by 560 days.

(21) Appl. No.: 13/127,369

(22) PCT Filed: Mar. 4, 2010

(86) PCT No.: PCT/EP2010/052747
§ 371 (c)(1),
(2), (4) Date: Jun. 8, 2011

(87) PCT Pub. No.: WO2010/105916
PCT Pub. Date: Sep. 23, 2010

(65) Prior Publication Data
US 2011/0317589 A1 Dec. 29, 2011

(30) Foreign Application Priority Data
Mar. 18, 2009 (EP) .................... 09100193

(51) Int. Cl.
*H04W 40/24* (2009.01)
(52) U.S. Cl.
CPC .................. *H04W 40/248* (2013.01)
(58) Field of Classification Search
USPC ....................................................... 370/255
See application file for complete search history.

(56) References Cited

U.S. PATENT DOCUMENTS

| 6,493,759 | B1* | 12/2002 | Passman et al. | 709/227 |
| 6,662,229 | B2* | 12/2003 | Passman et al. | 709/227 |
| 7,468,954 | B2* | 12/2008 | Sherman | 370/254 |
| 7,706,456 | B2* | 4/2010 | Laroia et al. | 375/260 |
| 2003/0067892 | A1* | 4/2003 | Beyer et al. | 370/328 |
| 2006/0203713 | A1* | 9/2006 | Laroia et al. | 370/209 |
| 2006/0203856 | A1* | 9/2006 | Laroia et al. | 370/522 |

FOREIGN PATENT DOCUMENTS

WO 2009/022950 A1 2/2009

OTHER PUBLICATIONS

IEEE, "Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Std. 802.16e 2005 and IEEE Std 802.16-2004/Cor1-2005, Feb. 28, 2006, 863 pages.
Ren, et al., "An Active Source Routing Protocol for Ad Hoc Networks", Proceedings of International Conference on Wireless Communications, Networking and Mobile Computing, Sep. 23-26, 2005, pp. 690-693.

* cited by examiner

*Primary Examiner* — Timothy Weidner
(74) *Attorney, Agent, or Firm* — Brake Hughes Bellermann LLP

(57) ABSTRACT

A computer implemented method, computer readable medium and computing apparatus for distribution of network topology information in telecommunication networks comprising of a distribution of an information to a neighboring gateway node wherein the said information comprising an access node identifier, and a time validity indication of a network topology change, and wherein the said access node identifier is mapped to a serving gateway.

19 Claims, 6 Drawing Sheets

METHOD AND APPARATUS FOR DISTRIBUTION OF TOPOLOGY INFORMATION IN COMMUNICATION NETWORKS

CROSS-REFERENCE TO RELATED APPLICATIONS

This application is a national stage entry of PCT Application No. PCT/EP2010/052747, filed on Mar. 4, 2010, entitled "METHOD AND APPARATUS FOR DISTRIBUTION OF TOPOLOGY INFORMATION IN COMMUNICATION NETWORKS," which, in turn, claims the benefit of priority based on EP Application No. 09100193.3, filed on Mar. 18, 2009, both of which are hereby incorporated by reference.

TECHNICAL FIELD

The present invention relates to distribution of network topology information in communication networks, particularly to a method, a network apparatus, a device and a computer readable medium for distribution of network topology information in a telecommunication network environment.

BACKGROUND

This invention may be applied to the following technology fields, WiFi and WiMAX network technology, 3GPP LTE (Long Term Evolution) network technology, and future network technology beyond the mentioned one.

WiMAX, meaning Worldwide Interoperability for Microwave Access, is a telecommunications technology that provides for the wireless transmission of data using a plurality of transmission modes, from point-to-point links to portable internet access. The technology is based on the IEEE 802.16 standards.

3GPP LTE (Long Term Evolution) is the name to a project within the Third Generation Partnership Project to cope with future technology evolutions. Goals include improving spectral efficiency, lowering costs, improving services, making use of new spectrum and refarmed spectrum opportunities, and better integration with other open standards. The LTE architecture is called EPS (Evolved Packet System) and comprises E-UTRAN (Evolved UMTS Terrestrial Radio Access Network) on the access side and EPC (Evolved Packet Core) on the core side. The LTE access network may consist of eNB (E-UTRAN Node B) nodes providing all radio interface related functions. The LTE core network may consists of the nodes S-GW (Serving Gateway) routing and forwarding user data packets, the nodes P-GW (PDN (Public Data Network) gateway) providing connectivity between the user equipment and the external packet data networks, MME (Mobile Management Entity) providing control functions for the LTE access network such as User Equipment identity, part of mobility, and security functions.

It has become an important topic for wireless cellular communication such as WiMAX and LTE to integrate multi-hop capability by deploying relay stations (RS).

Mobile WiMAX System standard is being standardized in WiMAX Forum. The Forum uses the broadband radio interface standardized by IEEE 802.16-2004 with a mobility amendment IEEE 802.16e-2005. The Forum specifies standard for network system architecture for mobile & portable terminals to access the Internet and operator services. Currently, a revision of the radio standard, IEEE 802.16-2009, issues.

Within the IEEE 802 LAN/MAN Standards Committee, a Broadband Wireless Access Working Group 802.16, Mobile Multihop Relay Task Group J (802.16j), has developed an amendment to the radio standards 802.16-2004, and 802.16e-2005. Currently a revision is standardized. The amendment standardizes the functionality of a relay station. A relay station is a radio station that receives the signal from 802.16j defined Multihop-Relay Base Station, further processes and amplifies it and re-transmits it towards the mobile stations that follow the 802.16-2009 protocol, and performs corresponding function for the signal in the opposite direction. The function of the relay station is completely transparent to the mobile station.

This invention is addressing the problem of the topology information distribution in a network example given supporting relay stations even in cases when the relay station has moved.

This invention is also addressing the problem of the topology information distribution in networks supporting femtocells. A femtocell is a small cellular base station, typically designed for use in residential or small business environments. It allows service providers to extend service coverage indoors. The concept is applicable to all standards, including GSM, CDMA2000, TD-SCDMA and WiMAX solutions. The distribution of topology information may be needed since the femtocell nodes may be transported to any location and attached to the network with no guarantees that it can be connected to the same gateway as during previous attachment. In this manner the WiMAX femto base stations may be transported to another Access Service Network gateway. An HNB Access Network comprises the two network element types Home Node B (HNB), and the Home Node B Gateway (HNB-GW).

The Home Node B provides 3G radio coverage for 3G handsets within a home location. The Home Node B Gateway (HNB-GW) is installed within an operator's network, and aggregates traffic from a large number of Home Node Bs back into an existing core service network through the standard interfaces.

The relay stations appear to the mobile stations like a base station, e.g. they may have the same type of identity designation (Base station identity, BSID) as the base station, but not performing all the functionalities of a base station. The way how functionalities are split between the base station and relay station can vary depending on the chosen options according to the 16j standard. The base station controls the operation of one or several relay stations assigned to it, and operates as a grooming point for the information traffic to or from the mobile stations via the relay stations that are directly transmitting to or from the mobile stations. The relay station may have other relay stations assigned to it, so that there may be a tree structure of relay stations dependent on a base station.

A relay station may perform a handover to a new base station, and may take all the attached mobile stations with it. Thus the topology of the network with relay stations may change dynamically. Similarly, a femto base station can be transported to any location and there is no guarantee that it will attach to the same gateway as before. Thus the topology of the network with femto base stations may change dynamically. The base station identifier used by mobile station, may relate to other base stations or relay stations as they are visible to the mobile station(s).

To accommodate relay stations in WIMAX two specific problems have to be addressed which are described below.

There is a procedure called association in the IEEE 802.16e radio standard. This procedure enables the mobile station to collect information about the surrounding base stations or relay stations, for example to estimate the radio path loss or signal to interference ratio for these elements (base station or relay station), while still being attached (registered) to the serving base station. The association procedure includes a ranging function, where the mobile station sends a short standardized bit sequence to the target element, and the element answers and tells, e.g., the power level, quality and time offset of the received sequence. The serving Base Station will send a request to organize a dedicated ranging resource at specified time and frequency (frequency in terms of sub channel) so that the associated base station can immediately recognize that it is the specified terminal that sent the ranging sequence. There is the request to find the right access points such as base stations or relay stations, sending messages.

Another similar need is for the hand-over purpose. In the preparation phase of a hand-over the serving base station and mobile Station agree about the new serving element, base station or relay station. In fact the mobile station is registered to the base station but the immediate serving transmitter may be a relay station, which has an identifier (BSID), so from the physical radio connectivity point of view the terminal communicates with the relay station.

The task of this invention may to provide a telecommunication network having a plurality of access nodes and a plurality of gateway nodes, with network topology information allowing full operation without restriction even in cases when the concerned access node such as base station or relay station has moved.

SUMMARY

According to an exemplary embodiment of the present invention a network apparatus, a device, a method and a computer readable medium is provided for the distribution of network topology information in a telecommunication network environment.

The term "network apparatus" may comprise any apparatus in a network, which may comprise of a locally fixed installed apparatus or a mobile apparatus and may comprise several devices. A device may be provided with software and hardware which empower the device acting as a node of the telecommunication network. A node may be an access node, a gateway, a server, or a mobile node. An access node may be a base station, a relay station, an access point, a Multihop-Relay base station, a node B, an evolved Node B, a Home Node B, a femtocell, or a WiMAX Femto Access Point. A gateway may be an Access Service Network gateway (ASN-GW), a Serving gateway, a Home Node B gateway or a Packet Data Node gateway. A server may be an Operation and Maintenance Server (O&M Server). An Operation and Maintenance System may comprise of one or several nodes providing network management functions for operation, administration, maintenance, and provisioning of networked systems. A mobile station, also named as subscriber station or terminal may be a mobile device like a mobile phone, PDA (Personal Digital Assistant), Internet Tablet, Laptop, CPE (Customer Premises Equipment) unit, modem or similar type of device.

According to an exemplary embodiment of the present invention the distribution of network topology information in telecommunication networks may have a plurality of access nodes and a plurality of gateway nodes wherein the said network topology information may allow each gateway node forwarding control messages to the right access node, even in cases when the concerned access node such as base station or relay station has moved. The network topology information may be dynamic because the access node may be mobile. The network topology information may be needed example given for routing control plane messages between the gateways.

According to an exemplary embodiment the distribution of network topology information in telecommunication networks having a plurality of access nodes and a plurality of gateway nodes said method comprising of a distribution of a first information to one or more neighboring gateway nodes wherein the said first information comprising of an access node identifier and a time validity indication. In this manner the neighboring gateway nodes are informed about network topology changes such as recently attached and removed access nodes.

According to a further exemplary embodiment the said first information may further comprising of mapping information from the said access node identifier to a network address of a gateway node. The said gateway node may be the serving gateway of the access node identified by the said access node identifier. The address of the serving gateway may be explicitly included within the message of the said first information or it may be extracted by the mobility or authorization procedures that are passing through it.

According to an further exemplary embodiment the distribution of network topology information to neighboring gateway nodes take place by an operation and maintenance gateway system collecting the access node identifiers from the serving gateway, and the said operation and maintenance system distributing the said access node identifier and the said time validity indication to the said neighboring gateways. The time validity indication may be identified by a time stamp or a time to live identification.

According to a further exemplary embodiment the operation and maintenance system may collect and distribute the mapping information of access node identifiers to gateway addresses. The access node identifier may address a relay station or a femtocell and the gateway address may be the IP address of its serving gateway node. The distribution of the mapping information may happen on regular basis, after certain periods or after certain events such as augmentation or reconfiguration of the telecommunication network.

According to a further exemplary embodiment the distribution of the network topology information takes place by signaling it to neighboring gateways. The signaling may take place from a serving gateway to neighboring gateways by sending a message. This may happen within the control planes of the gateways. The said message may comprise of information comprising of one or more access node identifiers and a time validity indication. The access node identifier may address an attached or detached relay station or WiMAX Femto Access Point.

According to a further exemplary embodiment the serving gateway may distribute a message comprising mapping information of access node identifiers to gateway addresses. The access node identifier may be the identifier of a relay station and the gateway addresses may the IP addresses of gateways. The distribution of the network topology information may happen on regular basis, after certain periods or after certain events such as augmentation or reconfiguration of the telecommunication network.

According to a further exemplary embodiment the distribution of the network topology information to neighboring gateway nodes may comprise mapping information of access node identifiers to gateway nodes, and an indication of a time validity indication of the mapping information. The time validity of the mapping information may define a time stamp or a time to life indication.

According to a further exemplary embodiment the neighboring gateway may receive several mapping information concerning the same access node and may select those as the valid one which has been received latest from the neighboring gateway node.

According to a further exemplary embodiment the neighboring gateway may receive several versions of mapping information concerning the same access node and may select the newest one wherein the newest one selection may be based on the time validity indication attribute.

According to an exemplary embodiment a solicitation of topology information may be demanded. This may happen for example when a gateway node has wrong mapping information. Thus, the handover signaling may fail and the gateway may use a solicitation procedure fetching the latest topology information for a concerned access node.

According to a further exemplary embodiment the distribution of the network topology information may be queried from a soliciting gateway wherein the query may comprise an access node identifier assigned to a particular access node and may request to find which gateway is serving that said particular access node. The query may take place by broadcasting or unicasting a message to its neighbored gateway nodes.

According to a further exemplary embodiment a serving gateway may store network topology information comprising of a set of access node identifiers identifying the corresponding access nodes served by the said serving gateway. An access node identifier may identify a femtocell, a WiMAX Femto Access Point, or a relay station.

According to a further exemplary embodiment the storage of network topology information of an access node at the gateway may be achieved by storing a first access node identifier, a second access node identifier, and the assignment between the first access node identifier to the second access node identifier. The first access node identifier may address a relay station and, the second access node identifier may address a base station. Optionally the IP address of the base station which addresses the said base station may be stored. The said gateway may serve the base station which controls the said relay station.

According to a further exemplary embodiment the said access node identifier may be assigned to the IP address of the gateway which is connected to the base station which controls the said relay station. The access node identifier and the assignment to the IP address of the said gateway may be stored at the said gateway. The access node identifier may address a relay station or a base station such as a femtocell.

According to a further exemplary embodiment the access node may be a WiMAX Femto Access Point and the storage of network topology information may be achieved by storing the mapping information of the access node identifier of the WiMAX Femto Access Point to the IP address of the gateway node serving the said WiMAX Femto Access Point. The mapping information of the access node identifier of the WiMAX Femto Access Point and its IP address may also be stored.

According to a further exemplary embodiment the network topology information may comprise mapping information comprising of the assignment of a first access node identifier to a second access node identifier. The first identifier may address a relay station and the second access node identifier may address a serving base station of the relay station. The mapping information may further comprise of the assignment of the said first access node identifier to an IP address of the said serving base station.

According to a further exemplary embodiment the network topology information may comprise mapping information comprising of the assignment of a first access node identifier to an IP address. The said first access node identifier may address a relay station and the IP-address may address the gateway node serving the base station at which the relay station is assigned to.

According to a further exemplary embodiment the network topology information the gateway node has a time validity indication represented for example by a time stamp or a time to live value. Thus, the mapping information may expire after pre-configured time set by the originator of the said mapping information. This assures that each mapping information will time out even if an obsolete topology mapping has not been changed as the corresponding access node has for example not been moved or removed.

According to an exemplary embodiment the distribution of network topology information may comprise a signaling of second information from an access node to a serving gateway node wherein the said second information may comprise one or more access node identifiers. The access node identifier may be addressed to a relay station or a WiMAX Femto Access Point. The said signaling may be a message crossing example given the R6 interface from the access node to the serving gateway node. The message may comprise of the said second information comprising the said access node identifiers and informing the said serving gateway node about newly attached or detached relay stations or WiMAX Femto Access Points.

The access node identifier used by mobile station may be related to other base stations or relay stations. The said access node identifier may be used for enabling the routing of control plane messages in the gateway node. The transporting of the messages may be based on the IP address of the base stations and gateway nodes. Thus, the mapping information of access node identifier of the relay station to IP address of the gateway node or the base station may be needed.

According to a further exemplary embodiment the neighboring gateway information may be distributed to each gateway, wherein the neighboring gateway information may comprise the addresses of the neighboring gateway nodes. The addresses may be IP addresses of the neighboring gateway nodes. The neighboring gateway information may establish the neighbor relationship of each gateway and may be distributed by an Operation and Maintenance system. The neighbor relationship may enable the selection of a subset of the gateway nodes, may be needed for distribution of network topology information, and may minimize the signaling load caused by network topology information distribution between the gateway nodes.

DETAILED DESCRIPTION

To further clarify the objects, technical schemes and advantages of the present invention, the present invention is further described in detail with reference to the accompanying drawings and embodiments. It needs to be pointed out that the embodiments described here are merely for the purposes of illustrating the present invention; they are not to be understood as limiting the present invention.

FIG. 1 shows an exemplary embodiment of a communication network, wherein the forwarding of control messages may lead to problems as the gateway nodes are not informed which base station controls the relay station.

Figure 1:
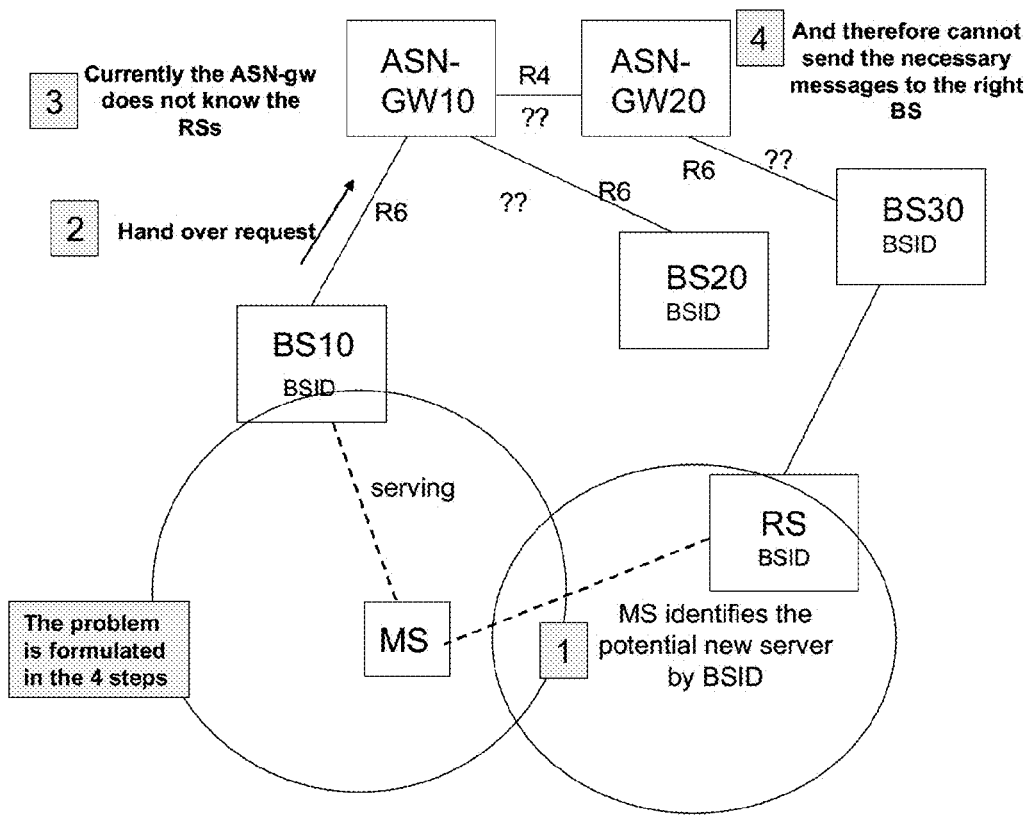
FIG. 1 shows an exemplary embodiment of a communication network, wherein control messages are forwarded.

There is a procedure called association in the standard IEEE 802.16e radio standard. This procedure enables the mobile station MS to collect information about the surrounding access nodes wherein the said access nodes may be base stations or relay stations. In the example given, the surrounding access node is the relay station RS. The said information supports for example estimating the radio path loss or signal to interference ratio for these access nodes to the mobile station, while still being attached and registered to the serving base station BS10. The association procedure includes a ranging function, wherein the Mobile Station sends a short standardized bit sequence to the target access node, and the access node responds with information comprising the power level, quality, and time offset of the received sequence. This procedure is marked as step 1 in FIG. 1 and allows the mobile station MS to identify its new potential serving access node RS by the access node identifier BSID.

Another similar procedure is needed for the handover purpose. During the preparation phase of a handover procedure the serving access node BS1 and mobile station MS may agree about the new potential serving access node which may the relay station RS in FIG. 1. In fact the mobile station MS may be registered at the new potential base station BS30 but the immediate potential serving transmitter may be the relay station RS. So from the physical radio connectivity point of view, the mobile station MS may communicate with the relay station RS.

In step 2, the serving Base Station BS10 may send a handover request to the access service network gateway ASN-GW10.

In order to the request finding to the right access node the gateway nodes may need the information to which base stations to send the request. This is marked in step 3 and 4 in FIG. 1. The serving gateway ASN-GW10 as well as the neighboring gateway ASN-GW20 do not know at which base station is the relay station RS attached to and the neighboring gateway ASN-GW20 cannot send the necessary messages to the base station BS30 to be sought after.

Figure 2:
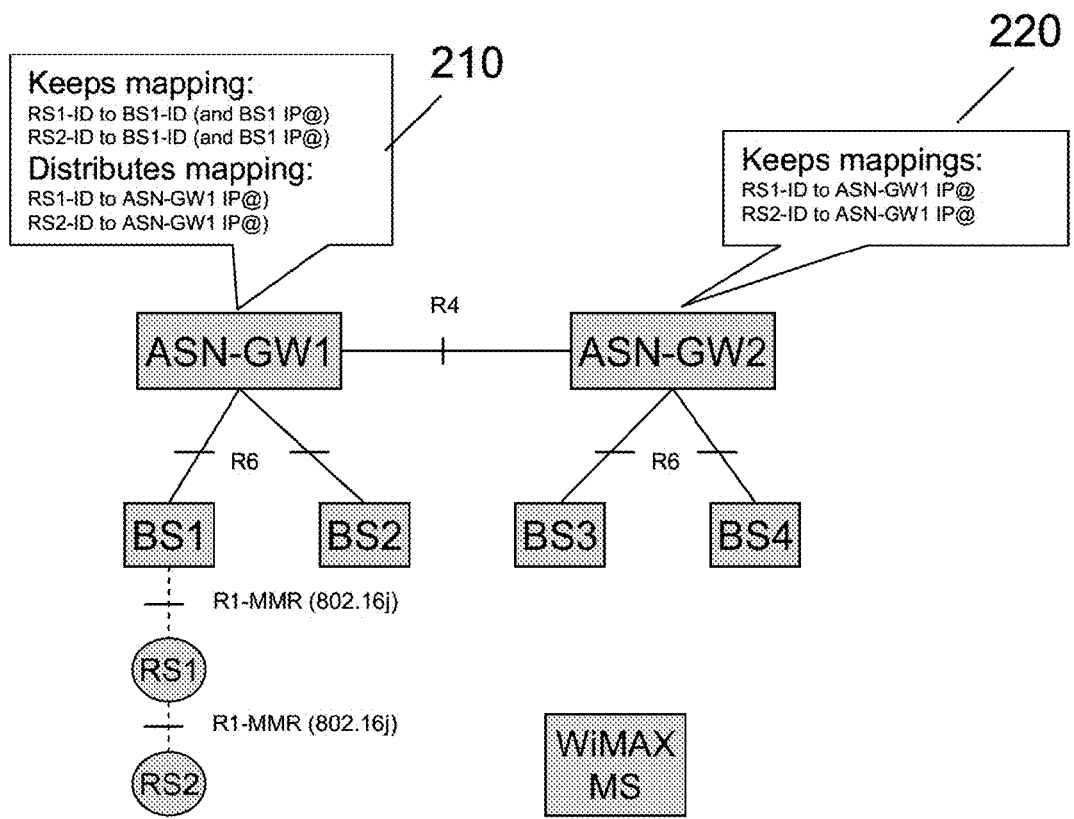
FIG. 2 shows an exemplary embodiment of the present invention comprising of a Mobile Multihop Relay network topology and illustrating what network topology information is stored at which gateway and to which gateway it is distributed.

FIG. 2 shows an exemplary embodiment of the present invention comprising of a Mobile Multihop Relay topology network and illustrating what network topology information is stored at which gateway and to which gateway it is distributed.

The network topology in FIG. 2 comprises of several nodes and interfaces connecting the nodes together. In detail, the gateways ASN-GW1 and ASN-GW2 are connected between each other via the interface R4. The base station BS1 and BS2 are connected via the interface R6 to the gateway ASN-GW1 and the base stations BS3 and BS4 are connected via the interface R6 to the gateway ASN-GW2. The relay station RS1 is connected via the interface R1-MMR (802.16j) to the base station BS1 and the relay station RS2 is connected via the interface R1-MMR (802.16j) to RS1. The mobile station WiMAX MS may have a radio link to one of the base stations or relay stations. The access node identifier RS1-ID may be connected with the relay station RS1, the access node identifier RS2-ID may be connected with the relay station RS2, the access node identifier BS1-ID may be assigned to the base station BS1, and the access node identifier BS2-ID may be assigned to the base station BS2.

The gateway nodes ASN-GW1 and ASN-GW2 may store some mapping information whereat access node identifiers are assigned to further access node identifiers or to IP-addresses. In addition, the gateway ASN-GW1 may distribute mappings information to the gateway ASN-GW2.

The gateway ASN-GW1 may keep firstly the mapping information of the access node identifier RS1-ID to the assigned access node identifier BS1-ID, and optionally the mapping information of the access node identifier RS-ID1 to the IP address of its serving access node BS1. Secondly, the gateway ASN-GW1 may keep the mapping of the access node identifier RS2-ID to the assigned access node identifier BS1-ID, and optional the mapping information of the access node identifier RS2-ID to the IP address of its serving access node BS1.

The gateway ASN-GW1 may distribute the mapping of the access node identifiers RS1-ID and RS2-ID to the IP address of the assigned serving gateway ASN-GW1.

The gateway ASN-GW2 may keep the mapping information received from the gateway ASN-GW1. This concerns firstly, the mapping information of the access node identifier RS1-ID to the IP address of the assigned serving gateway ASN-GW1, and secondly, the mapping information of the access node identifier RS2-ID to the IP address of the serving gateway ASN-GW1.

Figure 3:
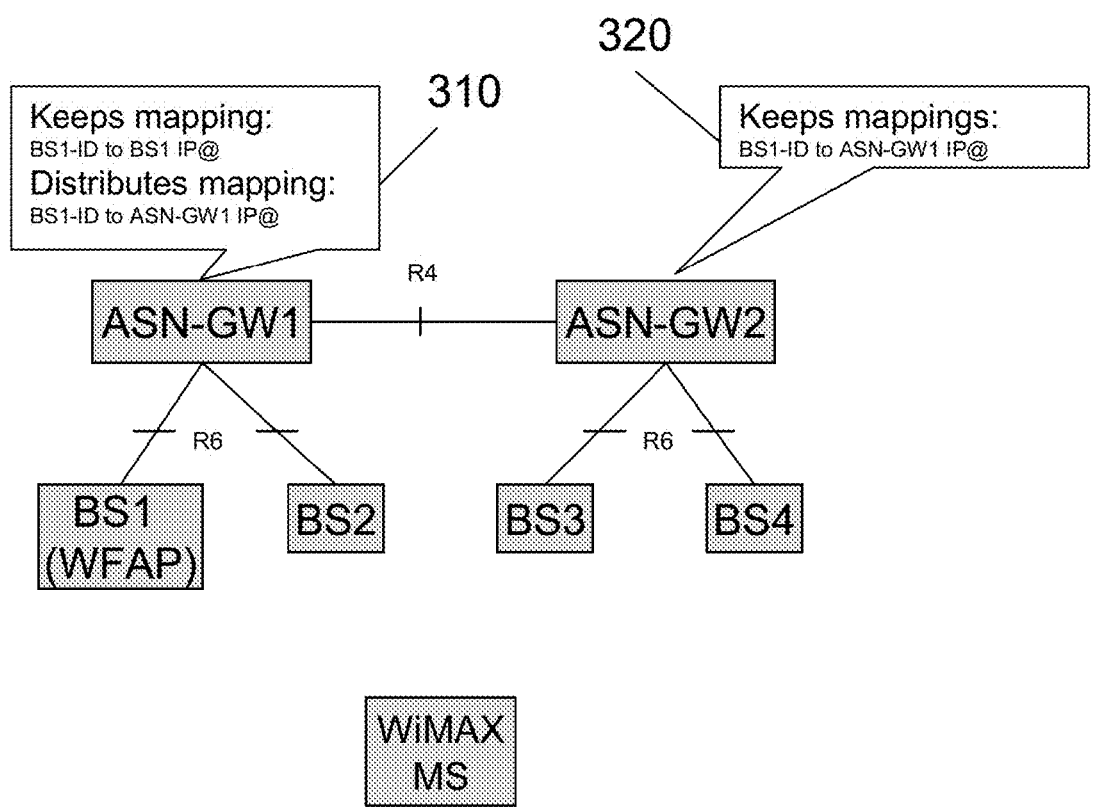
FIG. 3 shows an exemplary embodiment of the present invention comprising of a Femto network topology and illustrating what network topology information is stored at which gateway and to which gateway it is distributed.

FIG. 3 shows a further exemplary embodiment of the present invention comprising of a Femto network topology and illustrating which network topology information is stored at which gateway and to which gateway it is distributed.

The Network topology in FIG. 3 comprises of several nodes and interfaces connecting the nodes together. In detail, the femto gateways ASN-GW1 and ASN-GW2 are connected via the interface R4. The access node BS1 operates as a WiMAX Access node and is connected via the interface R6 to the femto gateway ASN-GW1. The access node BS2 is connected via the interface R6 to the femto gateway ASN-GW1 too, while the access nodes BS3 and BS4 are connected via the interface R6 to the gateway ASN-GW2. The mobile station WiMAX MS may have a radio link to one of the access nodes. The access node identifier BS1-ID may be assigned to the WiMAX Femto Access Point BS1.

The femto gateway ASN-GW1 and the access service network ASN-GW2 may manage mapping information which are called mapping in FIG. 3. In addition, the femto gateway ASN-GW1 may distribute network topology information to the gateway ASN-GW2 wherein the said network topology may comprise mapping information.

The femto gateway ASN-GW1 may store the mapping information of the access node identifier BS1-ID to the IP address of the WiMAX Femto Access Point BS1.

The femto gateway ASN-GW1 may distribute the mapping information of the access node identifier BS1-ID to the IP address of the assigned femto gateway ASN-GW1 which is the serving gateway of the WiMAX Femto Access Point BS1.

The gateway ASN-GW2 may keep mapping information received from the femto gateway ASN-GW1, and the mapping information may comprise the assignment of the access node identifier BS1-ID to the IP address of its femto gateway ASN-GW1.

Figure 4:
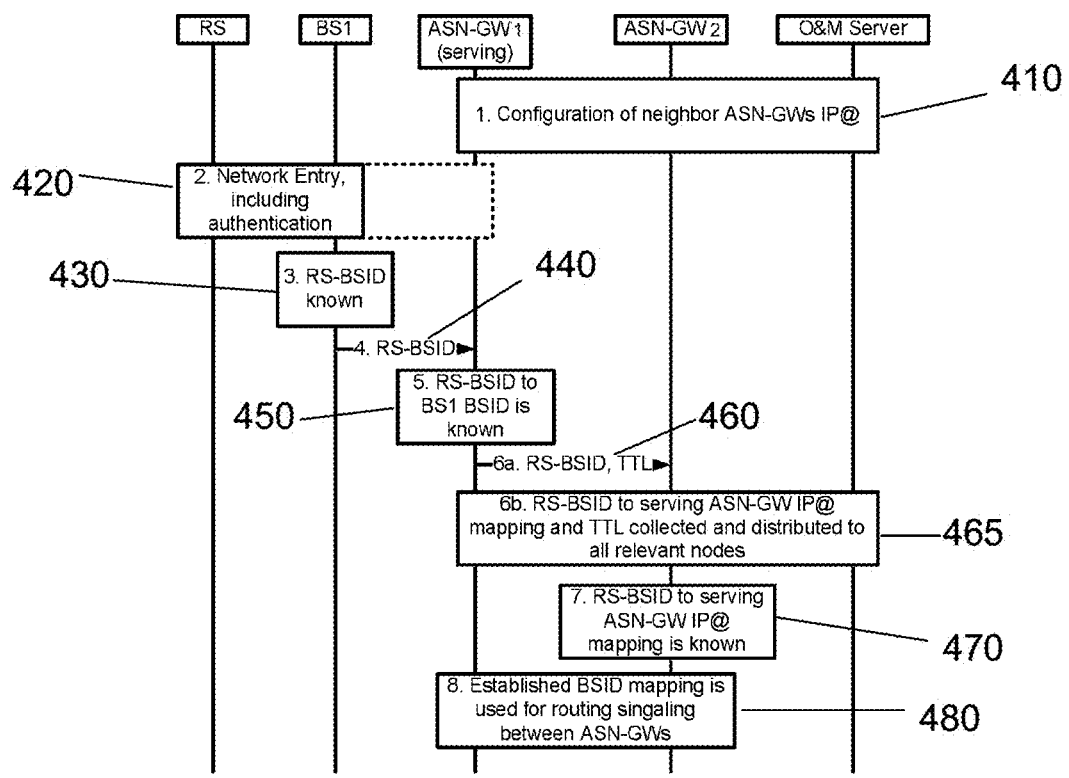
FIG. 4 shows an exemplary embodiment of the present invention wherein a communication flow diagram illustrates a procedure for distribution of network topology information in Mobile Multihop Relay networks.
Figure 5:
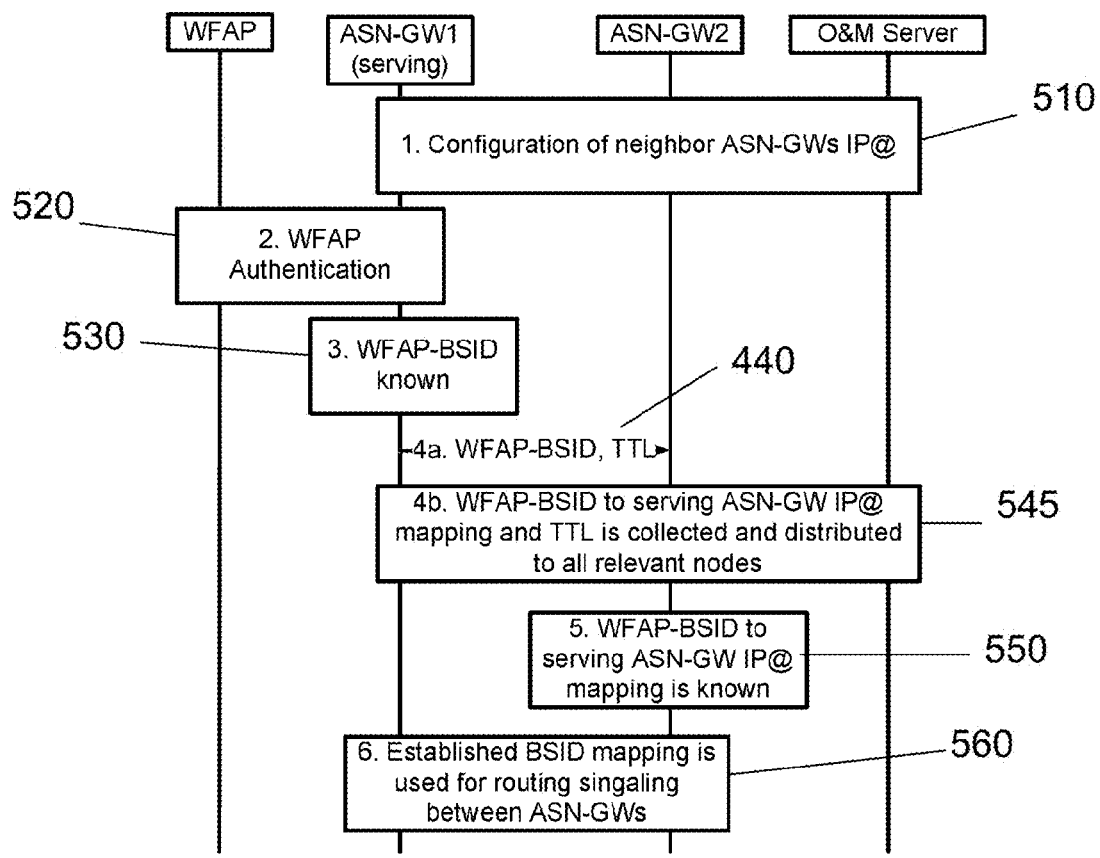
FIG. 5 shows an exemplary embodiment of the present invention wherein a communication flow diagram illustrates a procedure for distribution of network topology information in WiMAX Femto Access Point networks.
Figure 6:
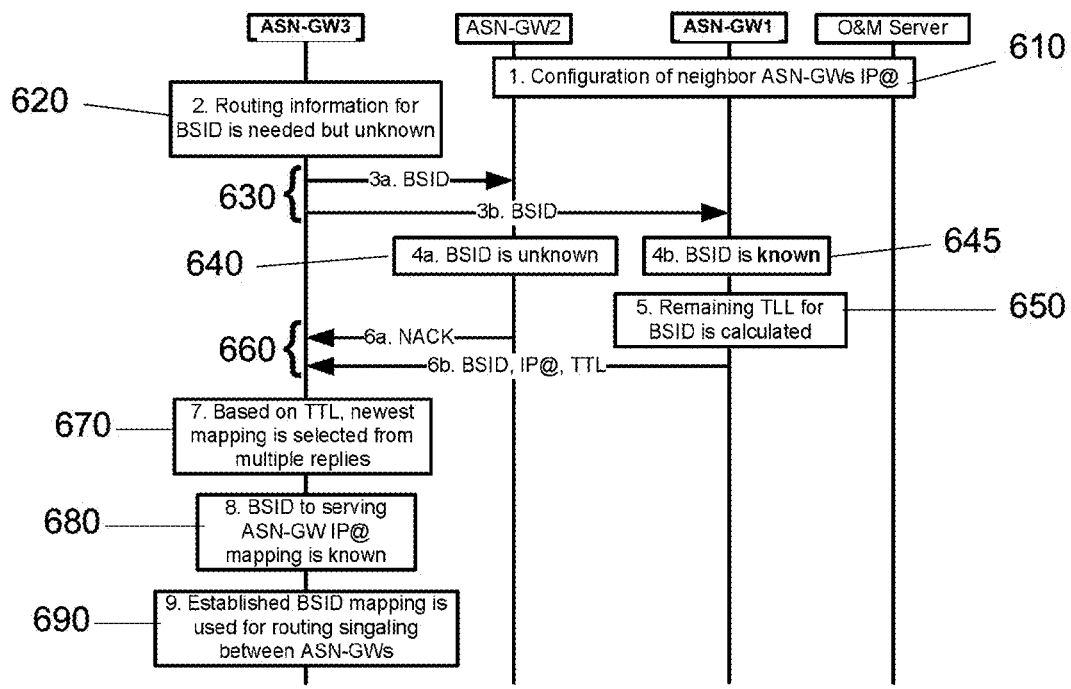
FIG. 6 shows an exemplary embodiment of the present invention wherein a communication flow diagram illustrates a procedure for soliciting the network topology information.

FIG. 4, FIG. 5 and FIG. 6 outlines flow diagram procedures for network topology information distribution implemented for network environments implementation wherein the said network may be a Mobile Multihop Relay or Femto network topology network. Each figure of them includes two variants, one using very frequent distribution of the network topology information via an operation and maintenance system, and the other one using explicit signaling in the control-plane of the gateways. The former being simpler but burdening the Operation and Maintenance system with mandating the distribution of each, example given 15 minutes, and predictably not scaling well with the number of Femto access nodes. The latter introducing new control messages into the gateways internal signaling, but scaling well with the number of Femto access nodes or relay stations.

The figure FIG. 4 below outlines the principles of the network topology information distribution procedure for Mobile Multihop Relay networks. The flow diagram comprises of the nodes: the relay station RS, access node BS1, the serving gateway ASN-GW1, the neighboring gateway ASN-GW2, and the operation and maintenance node O&M Server. The flow diagram procedure in FIG. 4 shows eight steps described in detail followed.

In the first step 410, the operation and maintenance system represented by the O&M Server may configure the gateways with neighboring information wherein the configuration may take place by the O&M Server distributing the IP addresses of the neighboring gateways to each gateway. In this manner the gateway ASN-GW1 may get the information of its neighboring gateway ASN-GW2 and vice versa.

In a second step 420, the relay station RS may enter the Mobile Multihop Relay network. This may include an authentication procedure involving the base station BS1.

The base station BS1 knows the access node identifier RS-BSID of the relay station RS after the authentication or identity assertion procedure in the third step 430.

In the fourth step 440, the base station BS1 may signal to the gateway ASN-GW1 a message comprising of the access node identifier RS-BSID of the new attached relay station BS.

In the fifth step 450, the gateway ASN-GW1 may have received the said message of the fourth step 440, or may have been participated in second step 420 and thus it knows the identity of the relay station RS newly attached to its serving base station BS1.

In the sixth step 460, the serving gateway ASN-GW1 may distribute to its neighbor gateway ASN-GW2 a message comprising of the access node identifier RS-BSID which identified the relay station RS. The said message may also comprise of the time validity indication TTL. The receiving node ASN-GW2 may deduces the IP address of the serving gateway ASN-GW1 from the IP transport layer. Alternatively, the IP address may be explicitly signaled within the said message.

An alternative solution of sixth step 465 may distribute the network topology information via the Operation and Maintenance system. In this case, the O&M Server node may collect the network topology information and may distribute the said network topology information to the neighbored gateway ASN-GW2. The said network topology information may comprise of the access node identifier RS-BSID of the relay station RS, the mapping information to the gateway ASN-GW1 serving the base station BS1, and the time validity indication TTL.

In the seventh step 470, the neighboring gateway ASN-GW2 may have received the network topology information from node ASN-GW1 or O&M Server as described in sixth step. The said network topology information may comprise of the mapping information of the access node identifier RS-BSID to the IP address of gateway ASN-GW1 serving the base station BS1.

In the eighth step 480, the established mapping information of the access node identifiers may be used for making routing decisions used for control messages between the gateways.

The flow chart procedure may be similarly when the relay station RS powers down or when the relay station RS handsover to another access node. In these cases the gateway ASN-GW1 or the O&M Server node may distribute the network topology information to the neighboring gateway ASN-GW2 comprising the removing of the mapping information of the access node identifier RS-BSID to serving gateway ASN-GW1.

FIG. 5 shows an exemplary embodiment of the present invention wherein a communication flow diagram illustrates the procedure for distribution of network topology information in WiMAX Femto Access Point networks.

The flow diagram comprises of the nodes: the WiMAX Femto Access Point WFAP, the serving gateway ASN-GW1, the neighboring gateway ASN-GW2, and the operation and maintenance node O&M Server. The flow diagram procedure in FIG. 5 may comprise of the following six steps:

In the first step 510, the operation and maintenance node O&M Server may configure each gateway node with neighboring network topology information wherein the configuration may take place by the O&M Server node distributing the IP addresses of the neighboring gateways to each gateway. In this manner the gateway ASN-GW1 may get the information of its neighboring gateway ASN-GW2 and vice versa.

In a second step 520, the node WFAP may enter the WiMAX Femto Access Point network. This may include an authentication procedure with its serving access service network gateway ASN-GW1.

In a third step 530, the gateway ASN-GW1 may know the access node identifier WFAP-BSID of the assigned WiMAX Femto Access Point node after the authentication or identity assertion procedure in the third step 520.

In the fourth step 540, the serving gateway ASN-GW1 may distribute to its neighboring gateway ASN-GW2 a message comprising of the access node identifier WFAP-BSID identifying the WiMAX Femto Access Point WFAP. The said message may also comprise of the time validity indication TTL. The receiving node ASN-GW2 may deduces the IP address of the serving gateway ASN-GW1 from the IP transport layer. Alternatively, the IP address may be explicitly signaled within the said message.

In the alternative solution of fourth step 545 the network topology information may be distributed via the O&M Server. In this case, the O&M Server node may collect the network topology information and may distribute the said network topology information to the neighbored gateway ASN-GW2. The network topology information may comprise of the access node identifier WFAP-BSID identifying the WiMAX Femto Access Point node, the mapping information to its serving gateway ASN-GW1, and the time validity indication TTL.

In the fifth step 550, the neighboring gateway ASN-GW2 may know the network topology information received from node ASN-GW1 or O&M Server as described in the said fourth step. The said network topology information may comprise of the mapping information of the access node identifier WFAP-BSID to the IP address of its serving gateway ASN-GW1.

In the sixth step 560, the established mapping information of access node identifiers may be used for making routing decisions for control messages between the gateways.

The procedure may be similarly when the WiMAX Femto Access Point WFAP powers down or when the WiMAX Femto Access Point WFAP hands-over to another gateway node. In these cases, the gateway ASN-GW1 or the node O&M Server may distribute the network topology information to the neighboring gateway ASN-GW2 comprising the removing of the mapping of the access node identifier WFAP-BSID to the serving gateway ASN-GW1.

FIG. 6 shows an exemplary embodiment of the present invention wherein a communication flow diagram illustrates the procedure for soliciting the network topology information.

The flow diagram comprises of the gateway nodes ASN-GW1, ASN-GW2 and ASN-GW3, and the O&M Server node representing the operation and maintenance system. The flow diagram procedure in FIG. 6 may comprise of the following nine steps.

In the first step 610, the operation and maintenance node O&M Server may configure each gateway node with neighboring network topology information wherein the configuration may take place by the O&M server distributing the neighboring gateways' IP addresses to each gateway. In this manner the gateways ASN-GW1, ASN-GW2, and ASN-GW3 may get implicitly the neighboring relationship.

In a second step 620, the soliciting gateway ASN-GW3 may discover the necessity updating its network topology information. This may happen when routing information for a certain access node is unknown but needed.

In the third step 630, the soliciting gateway ASN-GW3 may signal to its neighboring gateways ASN-GW2 and ASN-GW1 the request message for discovering the network topology for the access node identifier BSID.

In the fourth step 640 and 645, gateway ASN-GW2 does not have any knowledge of the requested access node addressed by access node identifier BSID but the soliciting gateway ASN-GW3 knows the network topology information of the said received access node identifier BSID.

In the fifth step 650, the soliciting gateway ASN-GW3 may calculate and update the time validity indication TTL.

In the sixth step 660, the gateway ASN-GW2 may signal to soliciting gateway ASN-GW3 a message comprising of the negative acknowledgement NACK as response to the said discovery message as send in third step 630. This message may be omitted reducing signaling overhead. Further, the serving gateway ASN-GW1 may signal to the soliciting gateway ASN-GW3 a message comprising of the access node identifier BSID, and the mapping to the IP address of its serving gateway. The said message may also comprise the time validity indication TTL.

In the seventh step 670, the soliciting gateway ASN-GW3 may receive several versions of the network topology information and may select the newest mapping information wherein the newest one selection may be based on the time validity indication TTL.

In the eighth step 680, the soliciting gateway ASN-GW3 may have received the requested network topology information. The said network topology information may comprise the mapping information of the access node identifier BSID to the IP address of its serving gateway.

In the ninth step 690, the soliciting gateway ASN-GW3 may use the mapping information for making routing decisions used for control messages between the gateways.

What is claimed is:

1. A computer-implemented method for distribution of network topology information in telecommunication networks having a plurality of gateway nodes including a serving gateway node and a neighboring gateway node that is a neighbor to the serving gateway node, said method comprising:
   distributing a first information to the neighboring gateway node to identify the serving gateway node as serving an access node, wherein the first information comprises an access node identifier for the access node and a time validity indication of the first information, and wherein the access node identifier is mapped to the serving gateway node, wherein the first information further comprises an assignment of the access node identifier for the access node to the network address of the serving gateway node.

2. The method of claim 1, wherein the access node comprises a first access node, and wherein the method further comprises:
   signaling of a second information from a second access node to the serving gateway node, wherein the second information includes the access node identifier for the first access node and,
   the signaling taking place by sending from the second access node to the serving gateway node a message.

3. The method of claim 2, wherein the first access node is a base station, the second access node is a relay station, and the access node identifier identifies the relay station.

4. The method of claim 1, wherein the access node comprises a first access node, and wherein the method further comprises:
   signaling a second information from a second access node to the serving gateway node wherein
   the second information includes the access node identifier for the first access node and,
   the signaling including the serving gateway node by extracting the access node identifier from a mobility or an authorization procedure.

5. The method of claim 1, wherein the distributing of the first information comprises:
   collecting the access node identifier for the access node from the serving gateway node, and
   distributing the access node identifier, a network address of the serving gateway node, and the time validity indication to the neighboring gateway node.

6. The method of claim 1 wherein the distributing a/the first information includes transmitting a query from a soliciting gateway node to the serving gateway node.

7. The method of claim 1, wherein the serving gateway node stores the access node identifier.

8. The method of claim 1, and further comprising:
   distributing a third information to the serving gateway node wherein the third information comprising of the address of the neighboring gateway node.

9. The method of claim 1, wherein the serving gateway node and the neighboring gateway node are Access Service Network gateways of a WiMAX system.

10. The method of claim 1, wherein the first access node is a WiMAX Femto Access Point, and the access node identifier for the access node identifies the WiMAX Femto Access Point.

11. The method of claim 1 wherein the distributing the first information comprises at least one of the following:
   distributing the first information from the serving gateway node to the neighboring gateway node to identify the serving gateway node as serving the access node, wherein the first information comprises the access node identifier for the access node and the time validity indication of the first information; and distributing the first information to the neighboring gateway node, the first information including the access node identifier, a network address of the serving gateway node, and the time validity indication of the first information.

12. The method of claim 1 and further comprising:
using, by the neighboring gateway node, the first information for routing signaling between one or more other gateway nodes including for routing signaling associated with the access node to the serving gateway node.

13. The method of claim 1 wherein the time validity indication comprises at least one of:
a time to live indication; and
a time stamp.

14. A computing apparatus for the distribution of network topology information in telecommunication networks, the telecommunications networks having a plurality of gateway nodes including a serving gateway node and a neighboring gateway node that is a neighbor to the serving gateway node, the computing apparatus configured to:
distribute a first information to the neighboring gateway node to identify the serving gateway node as serving an access node, wherein the first information comprises an access node identifier for the access node and a time validity indication of the first information, and wherein the access node identifier is mapped to the serving gateway node, wherein the first information further comprises an assignment of the access node identifier for the access node to the network address of the serving gateway node.

15. The computing apparatus of claim 14, wherein the access node comprises a first access node, and wherein the computing apparatus is further configured to:
signal a second information from a second access node to the serving gateway node wherein the second information includes the access node identifier for the first access node and,
the signaling including the serving gateway node extracting the access node identifier from a mobility or an authorization procedure.

16. The computing apparatus of claim 14 wherein the computing apparatus being configured to distribute the first information comprises the computing apparatus being configured to:
an operation and maintenance system collecting the access node identifier for the access node from the serving gateway node, and
the operation and maintenance system distributing the access node identifier, a network address of the serving gateway node, and the time validity indication to the neighboring gateway node.

17. The computing apparatus of claim 14 wherein the computing apparatus being configured to distribute a/the first information comprises the computing apparatus being configured to:
signal from the serving gateway node to the neighboring gateway node.

18. The computing apparatus of claim 14 wherein the computing apparatus being configured to distribute a/the first information comprises the computing apparatus being configured to:
transmit a query from a soliciting gateway node to the serving gateway node.

19. A non-transitory computer readable medium having instructions stored thereon and provided for distribution of network topology information in telecommunication networks, the telecommunications networks having a plurality of gateway nodes including a serving gateway node and a neighboring gateway node that is a neighbor to the serving gateway node, wherein the instructions when executed by a computing apparatus, cause the computing apparatus to:
distribute a first information to the neighboring gateway node to identify the serving gateway node as serving the access node, wherein the first information comprises an access node identifier for the access node and a time validity indication of the first information, and wherein the access node identifier is mapped to the serving gateway node, wherein the first information further comprises an assignment of the access node identifier for the access node to the network address of the serving gateway node.

* * * * *